United States Patent
Bains et al.

(10) Patent No.: US 11,016,669 B2
(45) Date of Patent: May 25, 2021

(54) PERSISTENT WRITE DATA FOR ENERGY-BACKED MEMORY

(71) Applicant: QUALCOMM Incorporated, San Diego, CA (US)

(72) Inventors: Kuljit Singh Bains, Olympia, WA (US); Raj Ramanujan, Federal Way, WA (US); Liyong Wang, Cary, NC (US); Wesley Queen, Raleigh, NC (US)

(73) Assignee: Qualcomm Incorporated, San Diego, CA (US)

( * ) Notice: Subject to any disclaimer, the term of this patent is extended or adjusted under 35 U.S.C. 154(b) by 165 days.

(21) Appl. No.: 15/968,738

(22) Filed: May 1, 2018

(65) Prior Publication Data

US 2019/0339865 A1  Nov. 7, 2019

(51) Int. Cl.
  *G06F 11/07* (2006.01)
  *G06F 3/06* (2006.01)
  *G06F 12/0891* (2016.01)

(52) U.S. Cl.
  CPC ............ *G06F 3/061* (2013.01); *G06F 3/0656* (2013.01); *G06F 3/0658* (2013.01); *G06F 3/0659* (2013.01); *G06F 3/0673* (2013.01); *G06F 11/0727* (2013.01); *G06F 11/0751* (2013.01); *G06F 11/0772* (2013.01); *G06F 12/0891* (2013.01); *G06F 2212/1032* (2013.01)

(58) Field of Classification Search
  None
  See application file for complete search history.

(56) References Cited

U.S. PATENT DOCUMENTS

| | | | |
|---|---|---|---|
| 9,111,583 B2* | 8/2015 | Trantham | G11B 27/36 |
| 9,529,543 B1* | 12/2016 | Chinnakkonda Vidyapoornachary | G11C 5/04 |
| 2013/0254453 A1* | 9/2013 | Sato | G06F 13/4027 710/317 |
| 2014/0181340 A1* | 6/2014 | Parthasarathy | G06F 13/14 710/107 |
| 2014/0297919 A1 | 10/2014 | Nachimuthu et al. | |
| 2015/0029808 A1* | 1/2015 | Allison | G11C 5/005 365/227 |
| 2015/0178202 A1 | 6/2015 | Sankaran et al. | |
| 2017/0147207 A1 | 5/2017 | Hansson et al. | |
| 2018/0095879 A1* | 4/2018 | Han | G06F 12/0804 |
| 2018/0341585 A1* | 11/2018 | Sreedhar M | G06F 12/0868 |
| 2019/0004940 A1* | 1/2019 | Boyd | G06F 12/0623 |
| 2019/0129631 A1* | 5/2019 | Lewis | G06F 12/123 |
| 2019/0129854 A1* | 5/2019 | Jo | G06F 3/0679 |
| 2019/0236029 A1* | 8/2019 | Butcher | G06F 3/0608 |

OTHER PUBLICATIONS

Intel: "Intel Architecture Instruction Set Extensions Programming Reference", Aug. 1, 2015 (Aug. 1, 2015), XP055609898, 1178 Pages, Retrieved from the Internet: URL:https://software.intel.com/sites/default/files/managed/07/b7/319433-023.pdf [retrieved on Jul. 30, 2019], Chapter 10.2 Persistent Memory.
International Search Report and Written Opinion—PCT/US2019/029657—ISA/EPO—dated Aug. 9, 2019.

* cited by examiner

*Primary Examiner* — Elias Mamo
(74) *Attorney, Agent, or Firm* — Edward J. Meisarosh (57) ABSTRACT

In non-energy-backed memory with persistent storage, a complex protocol is required to handle persistent writes. To address this issue, it is proposed to provide a simple protocol to handle persistent writes in energy-backed memory with persistent storage.

31 Claims, 6 Drawing Sheets

PERSISTENT WRITE DATA FOR ENERGY-BACKED MEMORY

FIELD OF DISCLOSURE

One or more aspects of the present disclosure generally relate to memory systems, and in particular, to handling persistent write data for energy-backed memories.

BACKGROUND

Basic protocol defined in JEDEC (Joint Electron Device Engineering Council) comprehends non-energy-backed NVDIMM-P (non-volatile dual in-line memory module). The NVDIMM-P is a very complex protocol that handles persistent writes as each write is tagged with a unique ID (WGID (Write Group ID)).

Writes to NVDIMM-P are considered "persistent" once they are in a domain on the DIMM that can survive power loss at the system level. When the writes are persistent, a power failure no longer implies data loss. One approach to ensure persistence is the non-energy-backed NVDIMM-P. In this approach, the host must use explicit commands on selected writes that require the NVDIMM to move them to persistent storage with a completion message to the host when this has occurred. In the event of a power loss, any writes that are still in volatile buffers or caches on the NVDIMM will be lost.

The host uses a PWRITE (persistent write) command for writes that require persistence. The NVDIMM may use this to select the buffers or caches that need to be moved to the persistent storage to survive a power loss. The NVDIMM may also move XWRITEs (normal writes) to the persistent storage during normal operation. However, unless otherwise specified, these are not required to survive a system power loss.

For non-energy-backed NVDIMMs, the data in buffers and any caches are not considered to be persistent in case of power loss. The PWRITE command can be used when persistence is required. It is the responsibility of the host controller to determine when to issue the PWRITE commands Each PWRITE command includes a transaction ID—WGID (Write Group ID)—to identify the specific data group to which the persistent write data will be associated. Once the persistent write operation has begun, the host controller tracks outstanding writes based on the WGID. The NVDIMM-P issues a W_PER (persistent write) response for the PWRITE command once all the data associated with a given WGID has been written to the persistent storage.

The host can also issue a FLUSH command to instruct the NVDIMM-P to move all data from the volatile space (cache and/or buffer) to the persistent storage. Upon completion of the flush operation, the NVDIMM provides the W_PER response. Flush requests, including both explicit FLUSH command and implicit flush request with PWRITE with persist bit '1', are completed. After the W_PER is received, the host may issue a SEND-W_PER command to retrieve an updated WGID bitmap status through a message packet to check which WGID is completed. The host can also request a pending WGID bitmap using XREAD-STATUS command.

Non-energy-backed NVDIMM-P supports two types of WGID bitmaps. The first type is the 'WGID completed bitmap'. Once all data associated with a given WGID has been written to the persistent storage, then in the NVDIMM, the corresponding bit in WGID bitmap is set as '1'. Once the 'WGID completed bitmap' is sent to the host in response to a SEND-W_PER command, then the bitmap is reset to all 0's in the NVDIMM.

The second type is the 'WGID pending bitmap'. The NVDIMM accepts and tracks pending PWRITES (or FLUSH) in the WGID pending bitmap. At power up, the WGID pending bitmap initialized to all '0's. The NVDIMM upon receiving a PWRITE (or FLUSH) with a new WGID will change the status of WGID bit to '1'. Once all data associated with the given WGID has been written to the persistent storage, the corresponding bit in WGID is marked as '0'. Transfer of the WGID pending bitmap to a host as a result of an XREAD command does not change the status of any WGID bits in the WGID pending bitmap.

The host can enable a 'WGID bitmap' mode by setting a mode register. If the mode is enabled, the NVDIMM prepares both the WGID completed bitmap and the WGID pending bitmap. The host can request the WGID completed bitmap using the SEND-W_PER command, and can request the WGID pending bitmap using the XREAD command for status.

Figure 1:
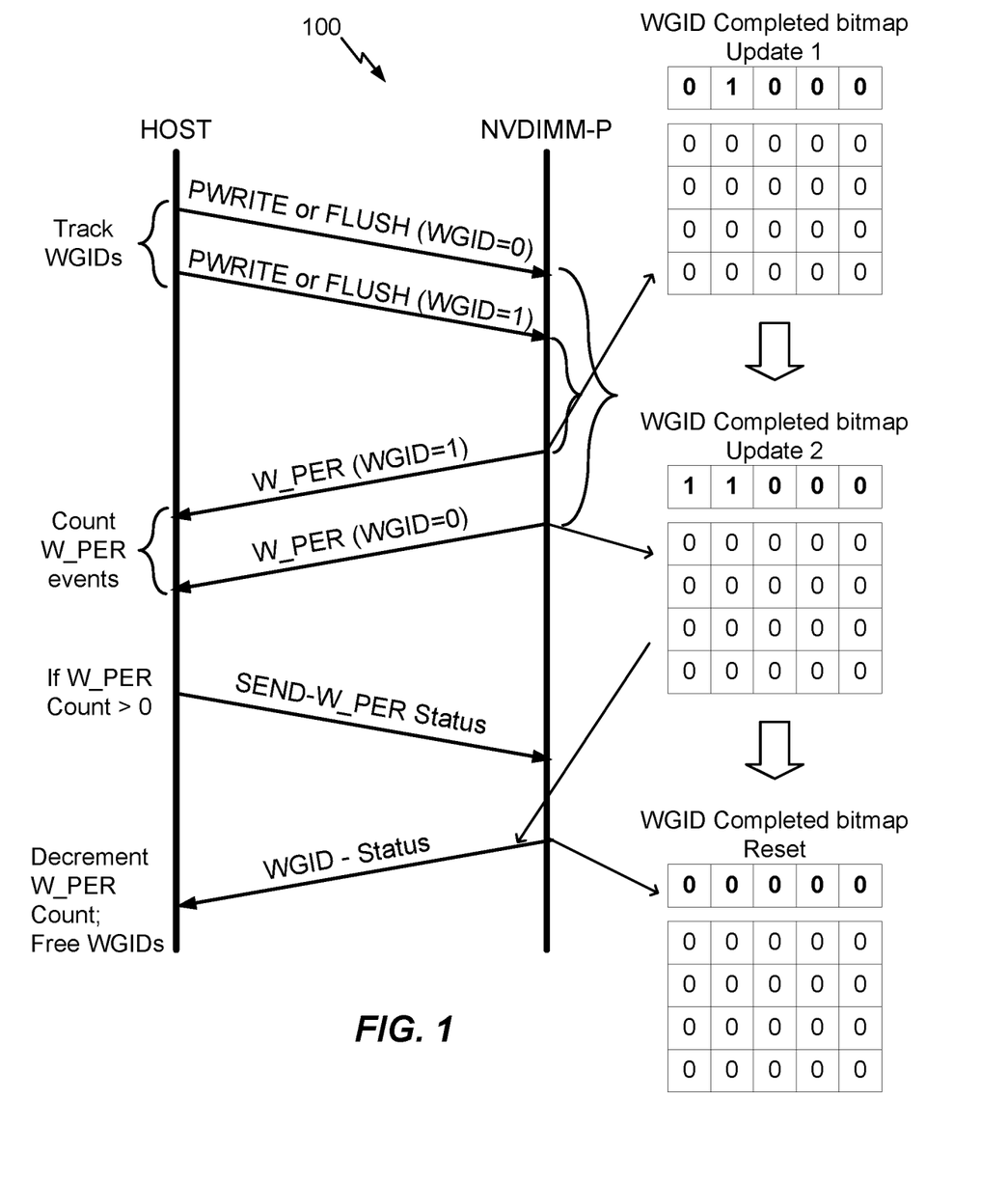
FIG. 1 illustrates an existing protocol performed in a non-energy-backed NVDIMM-P.

In the non-energy-backed NVDIMM-P, much communication can take place between the host and the NVDIMM. Also, there can be much required bookkeeping (e.g., the WGID completed bitmap, the WGID pending bitmap, etc.). FIG. 1 illustrates an example of a 'WGID Completed bitmap' flow control 100 between a host and a non-energy-backed NVDIMM-P:

1) The host issues PWRITE or FLUSH with WGID=0;
2) The host issues another PWRITE or FLUSH with WGID=1;
3) The NVDIMM retires all data to the persistent storage for WGID=1 and then asserts the W_PER. Out of order retiring is allowed and illustrated in this example. The NVDIMM sets WGID bit1 to '1' in 'WGID Completed bitmap';
4) The NVDIMM retires all data to the persistent storage for WGID=0 and then asserts W_PER. The NVDIMM sets WGID bit0 to '1' in 'WGID Completed bitmap';
5) The host tracks W_PER count. IF W_PER count>0, then the host may issue SEND-W_PER Status command. In this instance, the host issues the SEND-W_PER command after receiving two W_PERs;
6) The NVDIMM sends a 'WGID Completed bitmap' with bit0 and bit1 set to '1'. The NVDIMM resets the bits in the 'WGID Completed bitmap' that have been transferred to the host. The host decrements W_PER count by two and frees up two WGID's. The NVDIMM also has the option to send 'WGID completed bitmap' with only one bit set. In this case the W_PER count will still be >0 and the host may issue another SEND-W_PER status command.

It is then seen that under the non-energy-backed persistence handling, much communication takes place between the host and the NVDIMM. Also, there can be much required bookkeeping (e.g., the WGID completed bitmap, the WGID pending bitmap, etc.). In short, the non-energy-backed protocol for persistence handling is complex.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary apparatus is disclosed. The apparatus may be an energy-backed memory. The energy-backed memory may comprise a data buffer, a persistent storage, and a controller. The data buffer may be volatile and the persistent storage may be non-volatile. The controller may be configured to control an overall operation of the energy-backed memory. The controller may be configured to receive a persistent write command from a host, and the data buffer may be configured to receive persistent write data from the host corresponding to the persistent write command. The controller may be further configured to store the corresponding persistent write data from the data buffer to the persistent storage. Persistent write commands may be commands whose corresponding persistent write data are required to be persistent.

An exemplary method of an apparatus is disclosed. The apparatus may be an energy-backed memory comprising a data buffer and a persistent storage. The data buffer may be volatile and the persistent storage may be non-volatile. The method may comprise receiving, at the energy-backed memory, a persistent write command and corresponding persistent write data from a host. The corresponding persistent write data may be received at the data buffer of the energy-backed memory. The method may also comprise storing, by the energy-backed memory, the corresponding persistent write data from the data buffer to the persistent storage of the energy-backed memory. Persistent write commands may be commands whose corresponding persistent write data are required to be persistent.

Another exemplary apparatus is disclosed. The apparatus may be an energy-backed memory. The energy-backed memory may comprise a data buffer, a persistent storage, and a controller. The data buffer may be volatile and the persistent storage may be non-volatile. The controller may be configured to control an overall operation of the energy-backed memory. The controller may comprise means for receiving a persistent write command from a host, and the data buffer may receive persistent write data from the host corresponding to the persistent write command. The controller may also comprise means for storing the corresponding persistent write data from the data buffer to the persistent storage. Persistent write commands may be commands whose corresponding persistent write data are required to be persistent.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments of the disclosed subject matter include the discussed feature, advantage or mode of operation.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, processes, operations, elements, and/or components, but do not preclude the presence or addition of one or more other features, integers, processes, operations, elements, components, and/or groups thereof.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects may be embodied in a number of different forms, all of which have been contemplated to be within the scope of the claimed subject matter. In addition, for each of the examples described herein, the corresponding form of any such examples may be described herein as, for example, "logic configured to" perform the described action.

Recall from above that one disadvantage (of which there can be several) of a non-energy-backed NVDIMM-P is that the protocol for persistence handling can be complex. To address this and other issues, it is proposed to utilize one or more energy-backed memories. An energy-backed memory may be defined to be a memory that includes both volatile and non-volatile storages (details provided further below).

By using energy-backed memories such as energy-backed NVDIMMs, the protocol to handle persistence can be made much simpler. For example, one main advantage is that writes can be considered persistent once they are transferred successfully over to a controller on the energy-backed memory. Unlike the non-energy-backed cases, no WGID support is necessary for the energy-backed memories.

Figure 2:
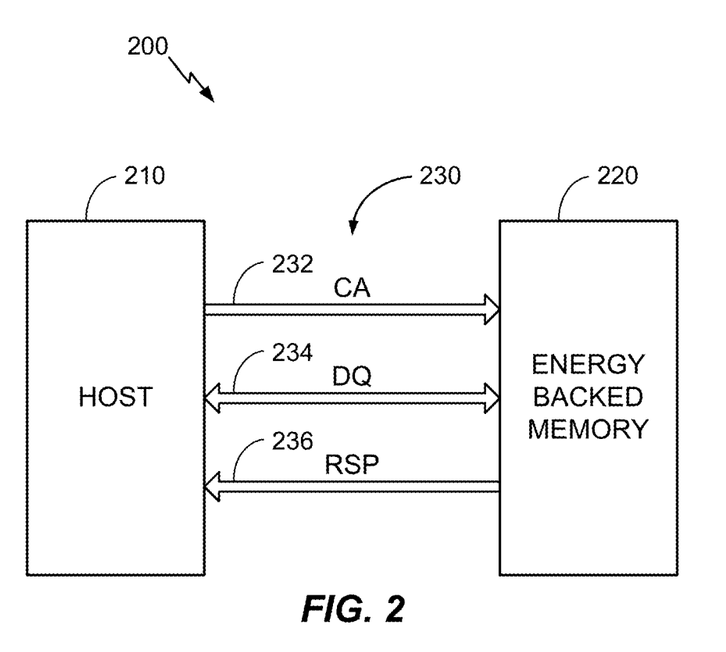
FIG. 2 illustrates an example of a memory system according to a non-limiting embodiment.

FIG. 2 illustrates an example of a memory system 200 that includes a host 210 in communication with an energy-backed memory 220 over a communication lane 230. The host 210 and the energy-backed memory 220 may be separate devices, or they may be integrated together in a single device. The host 210 may be a processor (or a plurality of processors) or an SoC (system-on-chip). As mentioned, the energy-backed memory 220 may be a memory that includes both volatile and non-volatile storages.

The communication lane 230 may include CA (command/address lines) 232, DQ (data lines) 234, and RSP (response lines) 236. The command/address lines CA 232 may be configured to carry command and address signals from the host 210 to the energy-backed memory 220. The data lines DQ 234 may be configured to carry data signals between the host 210 and the energy-backed memory 220 (e.g., write data from the host 210 to the energy-backed memory 220, read data from the energy-backed memory 220 to the host 210). The response lines RSP 236 may be configured to carry response signals from the energy-backed memory 220 to the host 210.

Writes to the energy-backed memory 220 may be considered "persistent" once the write data are in a domain on the energy-backed memory 220 that can survive power loss at the system level. When the writes are persistent, a power failure no longer implies data loss.

In the proposed energy-backed approach, there may be a backup energy source that can provide the energy-backed memory 220 with sufficient time to move the writes in the volatile storage to the persistent storage. With the proposed energy-backed approach, the host 210 may consider a write to be persistent as soon as the corresponding write data are in moved into the volatile storage of the energy-backed memory 220.

The energy backing may be provided at a memory level or at a system level. For the memory-based energy backing, it may be that only the energy-backed memory 220 is powered. In the event of a power loss, the rest of the system including the interfaces to the communication lane 230 need not stay operational. The energy-backed memory 220 may discover and manage the energy source.

The energy-backed memory 220 may also report the energy source capabilities and status to the host 210. For example, the energy-backed memory 220 may report a Backup_Energy_Min defined as a minimum available energy (e.g., in mWH) of the energy source. If there is no memory-based energy backing, this value may be reported as zero. The energy-backed memory 220 may keep the Backup_Energy_Min information updated as necessary. Another may be a Backup_Energy_Status, which may include error information as well as available lifetime of the energy source.

For the system-based energy backing, the energy source may reside at the system level. In the event of a power loss, the entire system (or a required subset) may remain operational for a period required to flush selected volatile content to the persistent storage. The system may discover and manage this energy source. As part of discovery, the system may determine the available back-up energy for flushing the volatile content to the persistent storage of the energy-backed memory 220.

Figure 3:
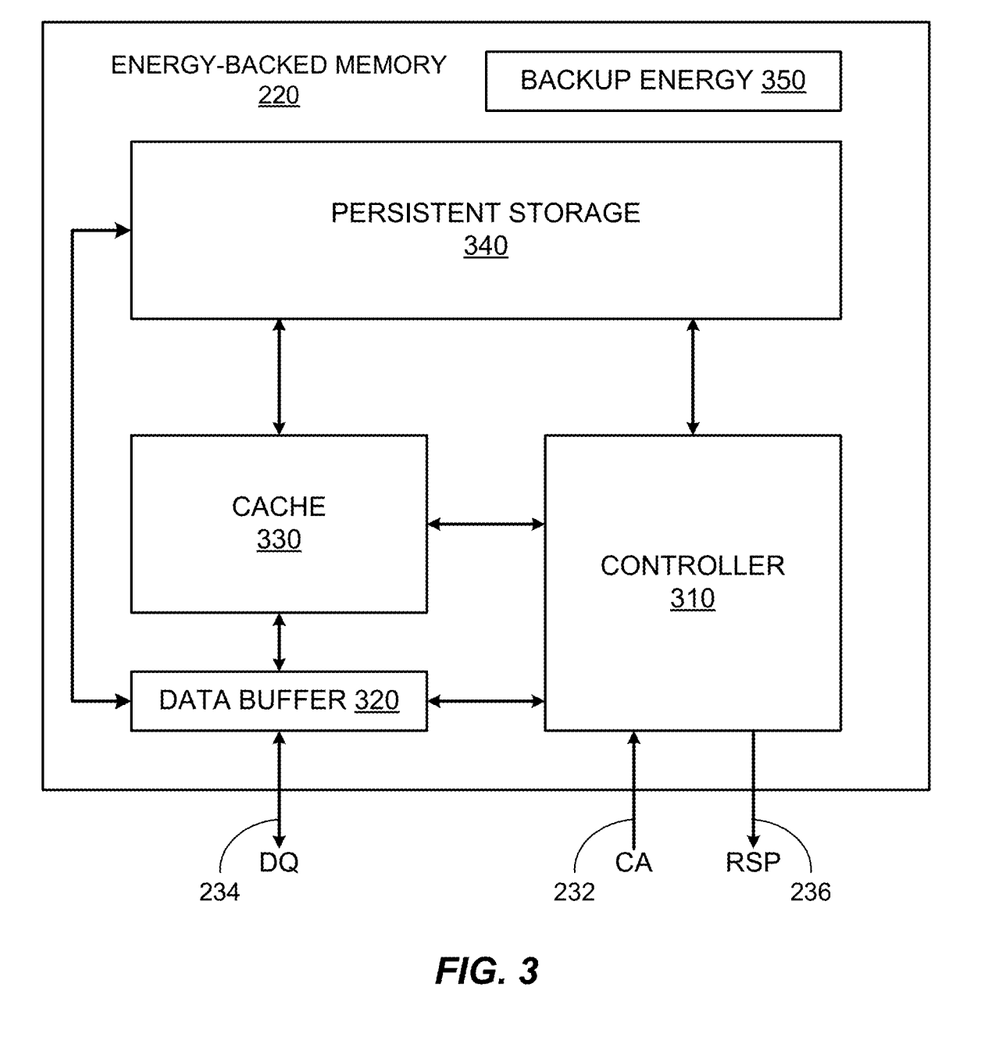
FIG. 3 illustrates an example of an energy-backed memory according to a non-limiting embodiment.

FIG. 3 illustrates a non-limiting example of the energy-backed memory 220. NVDIMM-P may be an example of the energy-backed memory 220. The illustrated energy-backed memory 220 may comprise a controller 310, a data buffer 320, a cache 330, a persistent storage 340, and a backup energy 350. The data buffer 320 and the cache 330 may be volatile. For example, they may comprise registers, DRAMs, SRAMs, and so on. On the other hand, the persistent storage 340 may be non-volatile. For example, it may comprise MRAMs, PCM, Flash, SSDs, and so on.

The controller 310 and the data buffer 320 may be configured to interface with the host 210 over the communication lane 230. In particular, the controller 310 may receive command and address signals from the host 210 over the command/address lines 232 and send response signals to the host 210 over the response lines 236. The data buffer 320 may receive write data from the host 210 and provide read data to the host 210 over the data lines 234.

In an aspect, the write data may be directly written from the data buffer 320 to the persistent storage 340, and the read data may be directly read from the persistent storage 340 to the data buffer 320. Thus, the cache 330 is not strictly necessary, i.e., it may be considered optional.

However, accesses to the cache 330 are likely to be faster than accesses to the persistent storage 340. Therefore, in another aspect, the cache 330 can be used to hide or otherwise mitigate access latencies of the persistent storage 340. For example, on reads, the read data may be read from the cache 330 to the data buffer 320 (assuming a cache hit). If a cache miss occurs, then the read data can be retrieved from the persistent storage 340.

On writes, the write data may be stored from the data buffer 320 to the cache 330. When required, the write data may also be stored to the persistent storage 340 through a write-through cache policy or through a write-back cache policy. The host 210 may specify which policy to implement to the energy-backed memory 220. In the write-through cache policy, the write data from the data buffer 320 may be written contemporaneously to the cache 330 and to the persistent storage 340 such that no reads of the write data takes place until the write data is stored to the persistent storage 340.

In the write-back cache policy, the write data may be initially stored to the cache 330. The written data need not be written contemporaneously to the persistent storage 340. The write data may be available for reads as soon as the write data is stored to the cache 330 regardless of whether or not the write data is also stored in the persistent storage 340.

The backup energy 350 may be configured to provide backup energy so that contents from the data buffer 320 and/or the cache 330 can be stored to the persistent storage 340 when a power loss occurs. The backup energy 350 may comprise one or more capacitors and/or batteries. The controller 310 may maintain information on the backup energy 350 (e.g., Backup_Energy_Min, Backup_Energy_Status, etc.) and report such information to the host 210. The controller 310 may be configured to perform the necessary actions to flush the data buffer 320 and/or the cache 330 to the persistent storage 340 when the power loss is detected.

Note that the backup energy 350 can be optional in that the backup energy 350 is an example of the memory-based energy backing. If the system-based energy backing is implemented, then the backup energy 350 is not strictly necessary. Of course, the backup energy 350 can be present, and one or both of the memory-based and system-based energy backing may be implemented. In an aspect, the host 210 may setup the energy-backed memory 220 to implement the memory-based energy backing and/or the system-based energy backing.

The controller 310 may be configured control an overall operation of the energy-backed memory 220 to service the commands received from the host 210. The commands from the host 210 may include, among others, a persistent write (PWRITE) command and a normal write (XWRITE) command. For both PWRITE and XWRITE commands, the host 210 may provide corresponding PWRITE and XWRITE data. The data buffer 320 may be configured to receive the PWRITE data and the XWRITE data.

As the name implies, PWRITE commands are commands whose corresponding PWRITE data are required to be persistent. In the context of the energy-backed memory 220, the persistence requirement can be met by storing the PWRITE data to the persistent storage 340. Therefore, in an aspect, when the PWRITE command is received, the controller 310 may be configured to store the corresponding PWRITE data from the data buffer 320 to the persistent storage 340.

On the other hand, XWRITE commands are commands whose corresponding XWRITE data are NOT required to be persistent. In the context of the energy-backed memory 220, the XWRITE data can be, but need NOT be, stored in the persistent storage 340. Therefore, in an aspect, when the XWRITE command is received, the controller 310 may or may not store the corresponding XWRITE data from the data buffer 320 to the persistent storage 340.

Figure 4:
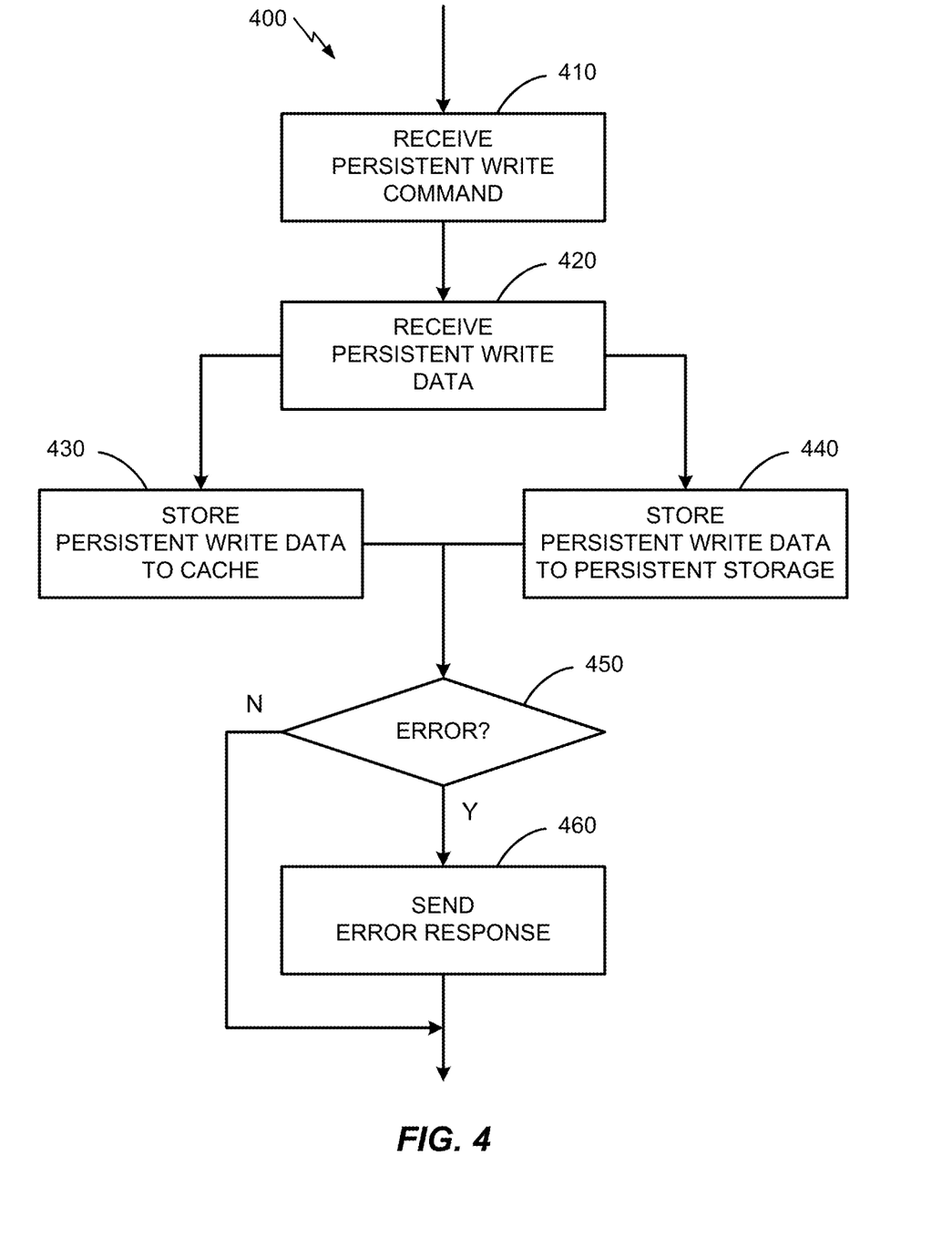
FIG. 4 illustrates a flow chart of an example process performed by an energy-backed memory to handle persistent writes according to a non-limiting embodiment.

FIG. 4 illustrates a flow chart of a non-limiting example process 400 performed by the energy-backed memory 220 to handle persistent writes. It should be noted that not all illustrated blocks of FIG. 4 need to be performed, i.e., some blocks may be optional. Also, the numerical references to the blocks in FIG. 4 should not be taken as requiring that the blocks should be performed in a certain order. Indeed, some blocks may be performed concurrently.

In block 410, the controller 310 may receive a PWRITE command from the host 210, e.g., over the command/address lines 232. The host 210 need NOT include any WGID in the PWRITE command issued to the energy-backed memory 220. If it is included, the controller 310 may ignore the WGID information. This is unlike the non-energy-backed implementation described above (see FIG. 1) in which WGID is required. In this way, the proposed energy-backed protocol can be made simpler.

In block 420, the data buffer 320 may receive the PWRITE data corresponding to the PWRITE command also from the host 210, e.g., over the data lines 234. Recall that PWRITE commands are commands whose corresponding PWRITE data are required to be persistent. Therefore, in block 440, the controller 310 may store the corresponding PWRITE data to the persistent storage 340.

If the cache 330 is present, then in block 430, the controller 310 may also store the corresponding PWRITE data to the cache 330. The controller 310 may store the PWRITE data to the cache 330 (block 430) and to the persistent storage 340 (block 440) through implementing the write-through cache policy or the write-back cache policy. If the energy-backed memory 220 is capable of implementing both policies, the host 210 may specify which policy to implement.

If the write-through cache policy is specified, the PWRITE data from the data buffer 320 may be written contemporaneously to the cache 330 and to the persistent storage 340 such that no reads of the PWRITE data takes place until the PWRITE data is stored to the persistent storage 340. If the write-back cache policy is specified, the PWRITE data may be initially stored to the cache 330. The PWRITE data may be available for reads as soon as the PWRITE data is stored to the cache 330 regardless of whether or not the PWRITE data is also stored in the persistent storage 340.

It should be noted that the controller 310 need not be required to implement any cache write policies for XWRITE data. This is because unlike the PWRITES, XWRITEs do not require persistence. In an alternative perspective, the XWRITE data may be treated as if the write-back cache policy is always in effect.

In an aspect, to differentiate between the PWRITE and XWRITE data, each PWRITE data in the data buffer 320 and/or the cache 330 may be marked as persistent, and each XWRITE data in the data buffer 320 and/or the cache 330 may be unmarked as persistent. For example, a persistence bit associated with each PWRITE data may be set to '1' and the persistence bit associated with each XWRITE data may be reset to '0'.

In block 450, the controller 310 may determine whether any error occurred while performing a PWRITE operation to store the corresponding PWRITE data to the persistent storage 340. For example, an error may occur when it is determined that the PWRITE data in the data buffer 320 is corrupted, e.g., through parity checking. There may also be insufficient space on the persistent storage 340, an error may occur in writing the PWRITE data to the cache 330 and/or the persistent storage 340, and so on.

When there is no error in performing the PWRITE operation, no response of any type need be sent back to the host 210. Unlike the non-energy-backed NVDIMM-P, no response is required upon successful completion with the proposed energy-backed implementation. This is another way that the proposed energy-backed protocol can be made simpler. In an aspect, the PWRITE operation may be considered to be successful when it is determined that the received PWRITE data in the data buffer 320 is valid, i.e., is not corrupted. In another aspect, the PWRITE operation may be considered to be successful when the PWRITE data is successfully stored in the cache 330. In yet another aspect, the PWRITE operation may be considered a success when the PWRITE data is successfully stored to the persistent storage 340.

When an error is detected in block 450, then in block 460, the controller 310 may send an error response (W_ERR) back to the host 210, e.g., over the response lines 236. In an aspect, the error response may be sent to the host 210 within a predetermined error report threshold duration of receiving the PWRITE command from the host 210. Then from the perspective of the host 210, the host 210 may consider a PWRITE to be successful if no response is received for the PWRITE from the energy-backed memory 220 within the error report threshold duration.

The commands from the host 210 may also include a flush (FLUSH) command. For example, the host 210 may issue the FLUSH command to power-down the system. The flush command may be a FLUSH PWRITE or a FLUSH ALL command. When the FLUSH (FLUSH PWRITE or FLUSH ALL) command is received, the controller 310 may be configured to flush to the persistent storage 340 the PWRITE data in the data buffer 320 and/or in the cache 330 of all PWRITE commands that have not yet been stored to the persistent storage 340.

If the FLUSH command is the FLUSH ALL command, then in addition to flushing the PWRITE data from the data buffer 320 and/or the cache 330, the controller 310 may also be configured to flush to the persistent storage 340 the XWRITE data in the data buffer 320 and/or in the cache 330 of all XWRITE commands that have not yet been stored to the persistent storage 340.

Figure 5:
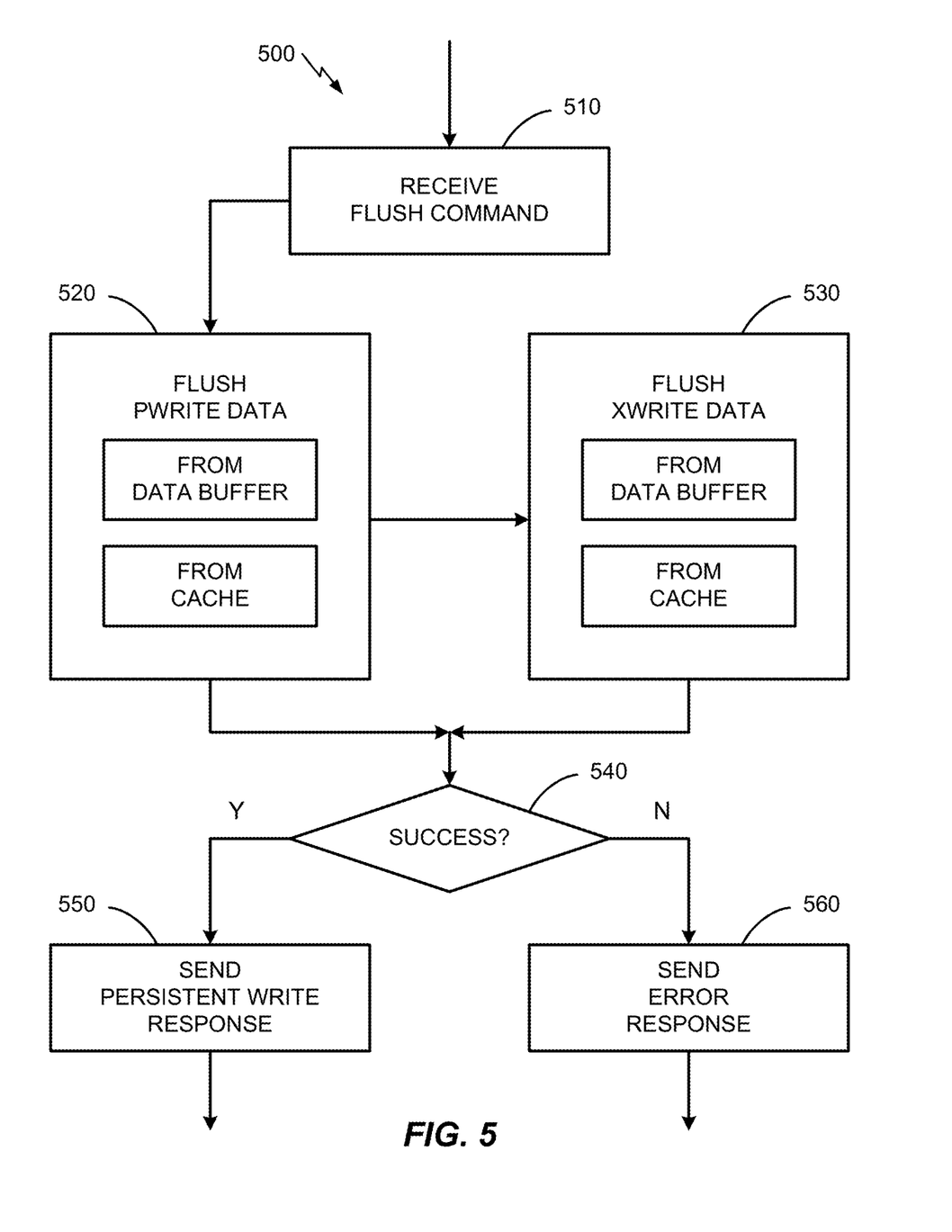
FIG. 5 illustrates a flow chart of an example process performed by an energy-backed memory to handle flushes according to a non-limiting embodiment.

FIG. 5 illustrates a flow chart of a non-limiting example process 500 performed by the energy-backed memory 220 to handle flushes. Again, it should be noted that not all illustrated blocks of FIG. 5 need to be performed, i.e., some blocks may be optional. Further, the numerical references to the blocks in FIG. 5 should not be taken as requiring that the blocks should be performed in a certain order. Indeed, some blocks may be performed concurrently.

In block 510, the controller 310 may receive a FLUSH command from the host 210, e.g., over the command/address lines 232. The host 210 need NOT include any WGID in the FLUSH command issued to the energy-backed memory 220. If it is included, the controller 310 may ignore the WGID information. This is unlike the non-energy-backed implementation described above (see FIG. 1) where the WGID identifies a specific group of the PWRITE data that are to be flushed. In this way, the proposed energy-backed protocol can be simpler.

In block 520, the controller 310 may flush to the persistent storage 340 the PWRITE data in the data buffer 320 of some or all PWRITE commands that have not yet been stored to the persistent storage 340. One way to guarantee this may be to simply flush all PWRITE data (e.g., those with persistence bits set to '1') in the data buffer 320 to the persistent storage 340. However, it may be preferred to identify those PWRITE data that have not yet been stored and flush the identified PWRITE data.

If the cache 330 is present, the controller 310 may additionally flush to the persistent storage 340 the PWRITE data in the cache 330 of some or all PWRITE commands that have not yet been stored to the persistent storage 340. Again, this can be guaranteed by simply flushing all PWRITE data (e.g., those with persistence bits set to '1') in the cache 330 to the persistent storage 340. This can take time and can consume power unnecessarily. Therefore, it may be preferred to flush only the dirty cache lines in the cache 330 marked as persistent.

Note that when the cache 330 is present, if the write-through cache policy is implemented, then flushing the PWRITE data from the data buffer 320 may be sufficient. That is, the flushing the cache 330 of the PWRITE data may not be necessary when the write-through cache policy is implemented. On the other hand, if the write-back cache policy is implemented, then flushing the PWRITE data from both the data buffer 320 and the cache 330 may be preferred.

If the FLUSH command is the FLUSH PWRITE command, then the process from block 520 may proceed to block 540. On the other hand, if the FLUSH command is the FLUSH ALL command, the process may proceed to block 530 in which the XWRITES may be flushed.

In block 530, the controller 310 may flush to the persistent storage 340 the XWRITE data in the data buffer 320 of some or all XWRITE commands that have not yet been stored to the persistent storage 340. One way to guarantee this may be to simply flush all data in the data buffer 320, regardless of whether or not they are marked persistent, to the persistent storage 340. However, it may be preferred to identify those data that have not yet been stored and flush only the identified data.

If the cache 330 is present, the controller 310 may additionally flush to the persistent storage 340 the XWRITE data in the cache 330 of some or all XWRITE commands that have not yet been stored to the persistent storage 340. Again, this can be guaranteed by simply flushing all data in the cache 330 to the persistent storage 340 regardless of whether or not they are marked persistent. However, it may be preferred to identify all dirty cache lines in the cache 330, whether or not they are marked persistent, and flush only the identified lines.

From block 520 (in case of FLUSH PWRITE) or from block 530 (in case of FLUSH ALL), the process may then proceed to block 540. In this block, the controller 310 may determine whether or not the FLUSH operation has successfully completed. If so, then in block 550, the controller 310 may send a persistent write response (W_PERS) to the host 210, e.g., over the response lines 236. If an error has occurred, then in block 560, the controller 310 may send an error response (W_ERR) to the host 210.

While not specifically shown, when the controller 310 detects a power loss, the controller 310 may automatically perform 520 so that persistence requirements for the PWRITE data can be met. If there is sufficient power available—e.g., through the backup energy 350 or the provided through a system-level backup energy—the controller 310 may also perform block 530 to save some or all XWRITE data.

Figure 6:
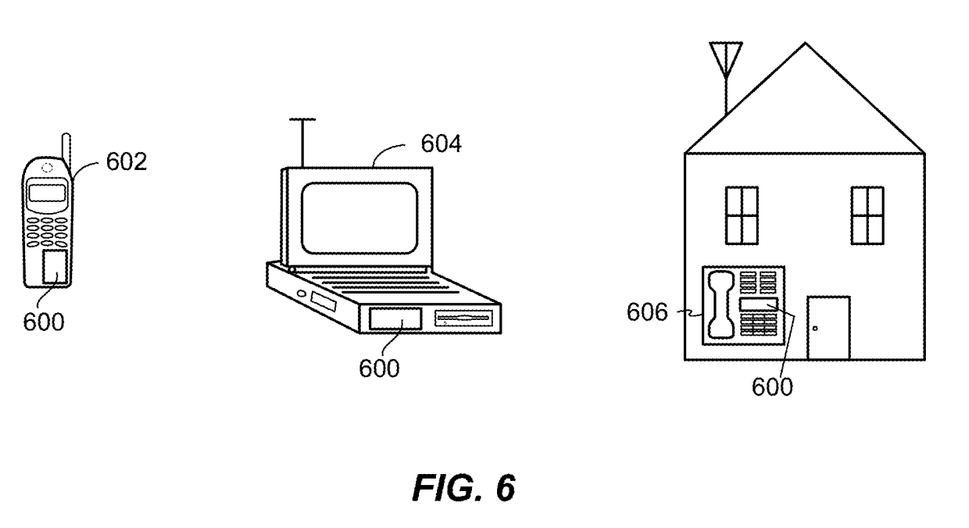
FIG. 6 illustrates examples of devices with a host and a plurality of devices daisy-chained to the host integrated therein.

FIG. 6 illustrates various electronic devices that may be integrated with the aforementioned apparatuses illustrated in FIGS. 2 and 3. For example, a mobile phone device 602, a laptop computer device 604, a terminal device 606 as well as wearable devices, portable systems, that require small form factor, extreme low profile, may include an apparatus 600 that incorporates the devices/systems as described herein. The apparatus 600 may be, for example, any of the integrated circuits, dies, integrated devices, integrated device packages, integrated circuit devices, device packages, integrated circuit (IC) packages, package-on-package devices, system-in-package devices described herein. The devices 602, 604, 606 illustrated in FIG. 6 are merely exemplary. Other electronic devices may also feature the apparatus 600 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), or any other device that stores or retrieves data or computer instructions, or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithms described in connection with the examples disclosed herein may be implemented as electronic hardware, computer software, or combinations of both. To clearly illustrate this interchangeability of hardware and software, various illustrative components, blocks, modules, circuits, and methods have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled with the processor such that the processor can read information from, and write information to, the storage medium. In the alternative, the storage medium may be integral to the processor.

Accordingly, an aspect can include a computer-readable media embodying any of the devices described above. Accordingly, the scope of the disclosed subject matter is not limited to illustrated examples and any means for performing the functionality described herein are included.

While the foregoing disclosure shows illustrative examples, it should be noted that various changes and modifications could be made herein without departing from the scope of the disclosed subject matter as defined by the appended claims. The functions, processes and/or actions of the method claims in accordance with the examples described herein need not be performed in any particular order. Furthermore, although elements of the disclosed subject matter may be described or claimed in the singular, the plural is contemplated unless limitation to the singular is explicitly stated.

What is claimed is:

1. An energy-backed memory, comprising:
   a data buffer;
   a persistent storage; and
   a controller configured to control an overall operation of the energy-backed memory,
   wherein the data buffer is volatile and the persistent storage is non-volatile,
   wherein the controller is configured to receive both a persistent write (PWRITE) command and a normal write (XWRITE) command from a host,
   wherein the PWRITE command is different from the XWRITE command,
   wherein the data buffer is configured to receive PWRITE data from the host corresponding to the PWRITE command,
   wherein the controller is further configured to store the corresponding PWRITE data from the data buffer to the persistent storage,
   wherein PWRITE commands are commands whose corresponding PWRITE data are required to be persistent,
   wherein the data buffer is configured to receive XWRITE data from the host corresponding to the XWRITE command, and
   wherein XWRITE commands are commands whose corresponding XWRITE data are not required to be persistent.

2. The energy-backed memory of claim 1,
   wherein the controller is configured to send an error response (W_ERR) back to the host within a predetermined error report threshold duration when an error occurs in performing a PWRITE operation to store the corresponding PWRITE data to the persistent storage, and
   wherein no response is sent to the host when the PWRITE operation is successful.

3. The energy-backed memory of claim 1, wherein the PWRITE command from the host does not include a working group ID (WGID) identifying a specific data group to which the corresponding PWRITE data is associated.

4. The energy-backed memory of claim 1, wherein the controller is configured to:
   receive a FLUSH command from the host,
   flush to the persistent storage the PWRITE data in the data buffer of all PWRITE commands that have not yet been stored to the persistent storage, and
   send a persistent write response (W_PERS) back to the host upon completion of the PWRITE data being flushed from the data buffer.

5. The energy-backed memory of claim 4, wherein the FLUSH command from the host does not include a working group ID (WGID) identifying a specific data group of the PWRITE data that are to be flushed.

6. The energy-backed memory of claim 4,
   wherein the FLUSH command is a FLUSH ALL command, and
   wherein the controller is configured to:
      flush to the persistent storage normal write (XWRITE) data in the data buffer of all XWRITE commands that have not yet been stored to the persistent storage, and
      send the W_PERS back to the host upon completion of the PWRITE data and the XWRITE data being flushed from the data buffer.

7. The energy-backed memory of claim 1, further comprising a cache,
   wherein the cache is volatile, and
   wherein the controller is configured to store the corresponding PWRITE data from the data buffer to the cache.

8. The energy-backed memory of claim 7, wherein the controller is configured implement one of a write-through cache policy and a write-back cache policy in storing the corresponding PWRITE data to the cache and to the persistent storage.

9. The energy-backed memory of claim 8, wherein the host specifies to the energy-backed memory whether to implement the write-through cache policy or the write-back cache policy.

10. The energy-backed memory of claim 7, wherein the controller is configured to:
    receive a FLUSH command from the host,
    flush to the persistent storage the PWRITE data in the data buffer and in the cache of all PWRITE commands that have not yet been stored to the persistent storage, and
    send a persistent write response (W_PERS) back to the host upon completion of the PWRITE data being flushed from the data buffer and from the cache.

11. The energy-backed memory of claim 10, wherein the FLUSH command from the host does not include a working group ID (WGID) identifying a specific data group of the PWRITE data that are to be flushed.

12. The energy-backed memory of claim 10,
    wherein the FLUSH command is a FLUSH ALL command, and
    wherein the controller is configured to:
       flush to the persistent storage normal write (XWRITE) data in the data buffer and in the cache of all XWRITE commands that have not yet been stored to the persistent storage, and
       send the W_PERS back to the host upon completion of the PWRITE data and the XWRITE data being flushed from the data buffer and from the persistent storage.

13. The energy-backed memory of claim 1, wherein the energy-backed memory is incorporated into a device selected from a group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

14. A method, comprising:
receiving, at an energy-backed memory, a persistent write (PWRITE) command and corresponding PWRITE data from a host, the corresponding PWRITE data being received at a data buffer of the energy-backed memory;
receiving, at the energy-backed memory, a normal write (XWRITE) command and corresponding XWRITE data from the host, the corresponding XWRITE data being received at the data buffer; and
storing, by the energy-backed memory, the corresponding PWRITE data from the data buffer to a persistent storage of the energy-backed memory,
wherein the data buffer is volatile and the persistent storage is non-volatile,
wherein the PWRITE command is different from the XWRITE command,
wherein PWRITE commands are commands whose corresponding PWRITE data are required to be persistent, and
wherein XWRITE commands are commands whose corresponding XWRITE data are not required to be persistent.

15. The method of claim 14, further comprising:
sending, by the energy-backed memory, an error response (W_ERR) back to the host within a predetermined error report threshold duration when an error occurs in storing the corresponding PWRITE data to the persistent storage and
wherein no message is sent to the host when the corresponding PWRITE data is successfully stored to the persistent storage.

16. The method of claim 14, wherein the PWRITE command from the host does not include a working group ID (WGID) identifying a specific data group to which the corresponding PWRITE data is associated.

17. The method of claim 14, further comprising:
receiving, at the energy-backed memory, a FLUSH command from the host;
flushing, by the energy-backed memory, to the persistent storage the PWRITE data in the data buffer of all PWRITE commands that have not yet been stored to the persistent storage; and
sending, by the energy-backed memory, a persistent write response (W_PERS) back to the host upon completion of the PWRITE data being flushed from the data buffer.

18. The method of claim 17, wherein the FLUSH command from the host does not include a working group ID (WGID) identifying a specific data group of the PWRITE data that are to be flushed.

19. The method of claim 17, wherein the FLUSH command is a FLUSH ALL command, the method further comprising:
flushing, by the energy-backed memory, to the persistent storage normal write (XWRITE) data in the data buffer of all XWRITE commands that have not yet been stored to the persistent storage; and
sending, by the energy-backed memory, the W_PERS back to the host upon completion of the PWRITE data and the XWRITE data being flushed from the data buffer.

20. The method of claim 14, further comprising storing, by the energy-backed memory, the corresponding PWRITE data from the data buffer to a cache of the energy-backed memory,
wherein the cache is volatile.

21. The method of claim 20, wherein the storing the corresponding PWRITE data to the cache and to the persistent storage are implemented as one of a write-through cache policy and a write-back cache policy.

22. The method of claim 21, wherein the host specifies to the energy-backed memory whether to implement the write-through cache policy or the write-back cache policy.

23. The method of claim 20, further comprising:
receiving, at the energy-backed memory, a FLUSH command from the host;
flushing, by the energy-backed memory, to the persistent storage the PWRITE data in the data buffer and in the cache of all PWRITE commands that have not yet been stored to the persistent storage; and
sending, by the energy-backed memory, the W_PERS back to the host upon completion of the PWRITE data being flushed from the data buffer and from the persistent storage.

24. The method of claim 23, wherein the FLUSH command from the host does not include a working group ID (WGID) identifying a specific data group of the PWRITE data that are to be flushed.

25. The method of claim 23, wherein the FLUSH command is a FLUSH ALL command, the method further comprising:
flushing, by the energy-backed memory, to the persistent storage normal write (XWRITE) data in the data buffer and in the cache of all XWRITE commands that have not yet been stored to the persistent storage; and
sending, by the energy-backed memory, the W_PERS back to the host upon completion of the PWRITE data and the XWRITE data being flushed from the data buffer and from the persistent storage.

26. An energy-backed memory, comprising:
a data buffer;
a persistent storage; and
a controller configured to control an overall operation of the energy-backed memory,
wherein the controller comprises:
means for receiving a persistent write (PWRITE) command and a normal write (XWRITE) command from a host, wherein respectively corresponding PWRITE data and XWRITE data are received at the data buffer from the host;
means for storing the corresponding PWRITE data from the data buffer to the persistent storage,
wherein the data buffer is volatile and the persistent storage is non-volatile,
wherein the PWRITE command is different from the XWRITE command,
wherein PWRITE commands are commands whose corresponding PWRITE data are required to be persistent, and
wherein XWRITE commands are commands whose corresponding XWRITE data are not required to be persistent.

27. The energy-backed memory of claim 26,
wherein the controller further comprises means for sending an error response (W_ERR) back to the host within a predetermined error report threshold duration when an error occurs in storing the corresponding PWRITE data to the persistent storage, and wherein no response is sent to the host when the corresponding PWRITE data is successfully stored to the persistent storage.

28. The energy-backed memory of claim 26, wherein the PWRITE command from the host does not include a working group ID (WGID) identifying a specific data group to which the corresponding PWRITE data is associated.

29. The energy-backed memory of claim 26,
wherein the controller further comprises:
  means for receiving a FLUSH command from the host,
  means for flushing to the persistent storage the PWRITE data in the data buffer of all PWRITE commands that have not yet been stored to the persistent storage, and
  means for sending a persistent write response (W_PERS) back to the host upon completion of the PWRITE data being flushed from the data buffer, and
wherein when the FLUSH command is a FLUSH ALL command,
  the means for flushing also flushes to the persistent storage normal write (XWRITE) data in the data buffer of all XWRITE commands that have not yet been stored to the persistent storage, and
  the means for sending sends the W_PERS back to the host upon completion of the PWRITE data and the XWRITE data being flushed from the data buffer.

30. The energy-backed memory of claim 26, further comprising a cache,
wherein the cache is volatile, and
wherein the means for storing stores the corresponding PWRITE data from the data buffer to the cache.

31. The energy-backed memory of claim 30,
wherein the controller further comprises:
  means for receiving a FLUSH command from the host,
  means for flushing to the persistent storage the PWRITE data in the data buffer and in the cache of all PWRITE commands that have not yet been stored to the persistent storage, and
  means for sending a persistent write response (W_PERS) back to the host upon completion of the PWRITE data being flushed from the data buffer and from the cache, and
wherein when the FLUSH command is a FLUSH ALL command,
  the means for flushing also flushes to the persistent storage normal write (XWRITE) data in the data buffer of all XWRITE commands that have not yet been stored to the persistent storage, and
  the means for sending sends the W_PERS back to the host upon completion of the PWRITE data and the XWRITE data being flushed from the data buffer and from the cache.

* * * * *